United States Patent [19]

Kobayashi

[11] Patent Number: 4,894,739

[45] Date of Patent: Jan. 16, 1990

[54] DISC RECORDING AND/OR REPRODUCING APPARATUS

[75] Inventor: Ko Kobayashi, Higashikurume, Japan

[73] Assignee: Teac Corporation, Japan

[21] Appl. No.: 307,215

[22] Filed: Feb. 3, 1989

Related U.S. Application Data

[63] Continuation of Ser. No. 67,928, Jun. 29, 1987, abandoned.

[30] Foreign Application Priority Data

Jul. 4, 1986 [JP] Japan .............................. 61-102071[U]

[51] Int. Cl.⁴ ............................................. G11B 5/012
[52] U.S. Cl. .................................................. 360/97.02
[58] Field of Search ............... 360/97.01, 97.02, 98.01, 360/99.01, 137

[56] References Cited

U.S. PATENT DOCUMENTS 4,367,502  1/1983  Iftikar ............................... 360/133 X
4,652,949  3/1987  Muraoka ............................ 360/97 X
4,754,397  6/1988  Varaiya ................................ 360/86

Primary Examiner—A. J. Heinz
Attorney, Agent, or Firm—Andrus, Sceales, Starke & Sawall

[57] ABSTRACT

A magnetic disc recording and/or reproducing apparatus comprises a frame, a recording/reproducing unit detachably mounted on a frame and a front panel detachably mounted on the frame and having an inserting opening through which the magnetic disc is inserted and removed. The frame is primarily designed to accommodate a first recording/reproducing unit adapted for a first magnetic disc and is selectively mounted with either one of the first recording/reproducing unit and a second recording/reproducing unit adapted for a second magnetic disc having a smaller diameter. Depending on the selected recording/reproducing unit, either one of a first front panel for the first magnetic disc and a second front panel for a second magnetic disc is selectively mounted on the frame.

1 Claim, 3 Drawing Sheets

DISC RECORDING AND/OR REPRODUCING APPARATUS

This application is a continuation of application No. 067,928, filed June 29, 1987 and now abandoned.

BACKGROUND OF THE INVENTION

The present invention generally relates to disc recording and/or reproducing apparatuses, and more particularly to a magnetic disc recording and/or reproducing apparatus in which a first recording/reproducing unit having a recording and reproducing head and a disc driving mechanism for recording and/or reproducing information signals on and/or from a first magnetic disc having a first diameter and a second recording/reproducing unit similarly designed but adapted for a second magnetic disc having a second diameter are selectively used depending on which one of the first and second magnetic discs is to be played.

Generally, electronic information processing systems such as personal computers, word processors and the like use a magnetic disc recording and/or reproducing apparatus as an external memory device. In such a magnetic disc recording and/or reproducing apparatus, information signals are magnetically recorded and reproduced on and from a magnetic disc.

Currently, there exist magnetic discs having standardized diameters such as 3.5 inches, 5.25 inches, 8 inches and the like. Various magnetic disc recording and/or reproducing apparatuses are designed for respective sizes of the magnetic discs. Usually, an electronic information processing system uses only one type of the magnetic disc recording and/or reproducing apparatus which is designed exclusively for playing a particular magnetic disc having a particular diameter. Thus, only one type of the magnetic disc can be used in an electronic information processing system.

For example, an electronic information processing system incorporating a magnetic disc recording and/or reproducing apparatus designed for a magnetic disc having a diameter of 5.25 inches cannot use a smaller magnetic disc having a diameter of 3.5 inches nor a larger magnetic disc having a diameter of 8 inches. Thus, there is a problem in that the electronic information processing system cannot use information and software recorded on a magnetic disc having a diameter of 3.5 inches or 8 inches. A similar problem arises when a software frequently used in the information processing system is recorded on a magnetic disc having a diameter of 3.5 inches or 8 inches and the software cannot be copied on a magnetic disc having a diameter of 5.25 inches.

SUMMARY OF THE INVENTION

Accordingly, it is a general object of the present invention to provide a novel and useful magnetic disc recording and/or reproducing apparatus wherein the problems aforementioned are eliminated.

Another and more specific object of the present invention is to provide a magnetic disc recording and/or reproducing apparatus which is to be incorporated within a body of an information processing system having an information processing circuit therein and comprises a frame primarily designed to accommodate a first recording/reproducing unit for recording and/or reproducing an information signal on and/or from a first magnetic disc having a first diameter, a recording/reproducing unit detachably mounted in the frame for recording and/or reproducing an information signal on and/or from a magnetic disc, and a front panel having a magnetic disc inserting opening and detachably mounted at an front end of the frame. The frame is selectively and detachably mounted with either one of the aforementioned first recording/reproducing unit and a second recording/reproducing unit for recording and/or reproducing an information signal on and/or from a second magnetic disc having a second diameter which is smaller than the first diameter. Further, the frame is selectively and detachably mounted with either one of a first front panel having a first magnetic disc inserting opening adapted for receiving the first magnetic disc and a second front panel having a second magnetic disc inserting opening adapted for receiving the second magnetic disc at the aforementioned front end of the frame in correspondence with the selected one of the first and second recording/reproducing units. The first and second recording/reproducing units respectively have first and second connectors at a rear end thereof for engagement with a third connector provided at a distal end of a cable extending from the information processing circuit of the information processing system. According to the present invention, magnetic discs having various diameters can be used in a magnetic disc recording and/or reproducing apparatus assembled within a body of an electronic information processing system such as a personal computer or a word processor. In the magnetic disc recording and/or reproducing apparatus according to the present invention, an intervening member may further be connected to the second recording/reproducing unit. The intervening member has a fourth connector at a front end thereof for engagement with the second connector at the rear end of the second recording/reproducing unit. The intervening member further has a fifth connector at a rear end thereof for engagement with the third connector at the distal end of the cable. With this intervening member connected to the rear end of the second recording/reproducing unit, any space that may be formed in the frame at a rear portion of the unit due to a smaller outer dimension of the second recording/reproducing unit as compared to that of the first recording/reproducing unit is closed. Thus, a problem of a shortage of cable length which arises in the above described case due to the smaller outer dimension of the second recording/reproducing unit is solved without the need for an extension or modification of the cable.

Other objects and further features of the present invention will be apparent from the following description when read in conjunction with the accompanying drawings.

DETAILED DESCRIPTION

Figure 1:
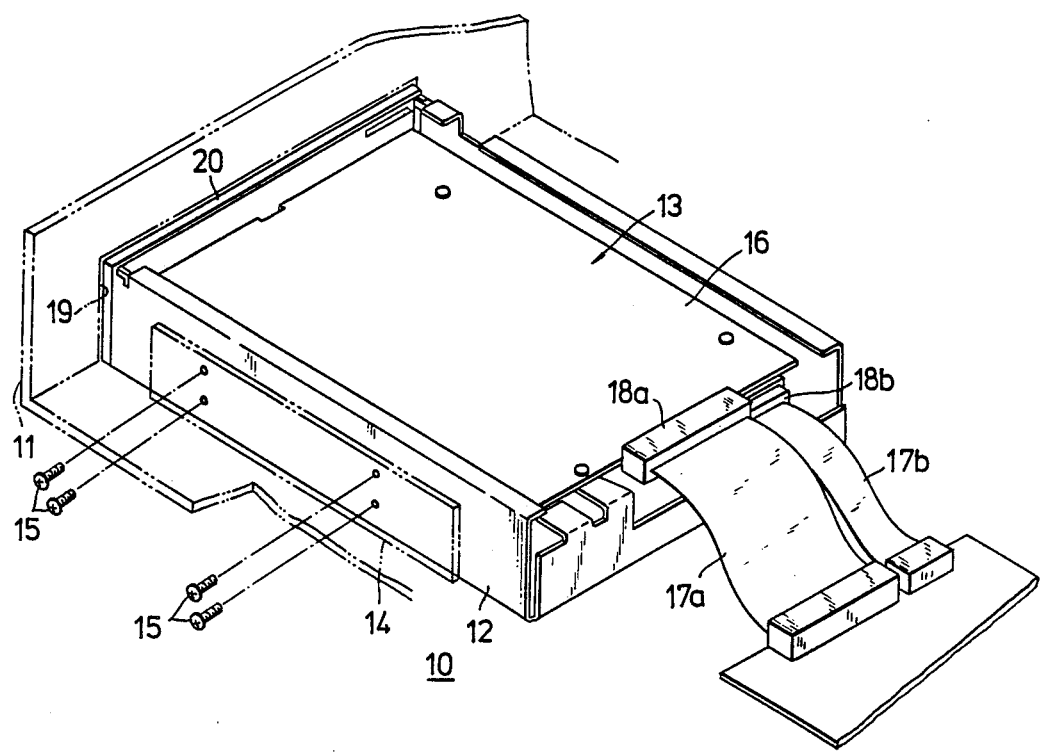
FIG. 1 is a perspective view showing an embodiment of the magnetic disc recording and/or reproducing apparatus according to the present invention in a state where a recording/reproducing unit adapted for a first magnetic disc having a diameter of 5.25 inches is mounted therein.

FIG. 1 shows an embodiment of the magnetic disc recording and/or reproducing apparatus according to the present invention. FIG. 1 shows an apparatus 10 adapted to use a first magnetic disc having a first diameter referred to hereinafter as a first disc. In the description hereinafter, the first disc is assumed to have a diameter of 5.25 inches and a second disc to be described later is assumed to have a diameter of 3.5 inches for convenience' sake.

Referring to FIG. 1, the apparatus 10 comprises a frame 12 incorporated in a body 11 of an electronic information processing system such as a personal computer and a word processor. A recording/reproducing unit 13 for holding the first disc and for recording and/or reproducing an information signal on and/or from the disc is detachably mounted on the frame 12 by known means such as screws (not shown). The frame 12 is mounted to a shelf portion 14 in the body 11 by screws 15. The recording/reproducing unit 13 itself is known and comprises a circuit board 16 which is mounted with a known magnetic disc holding mechanism, magnetic heads, magnetic disc driving mechanism and the like as well as associated electronic circuits. These parts are located underside of the board 16 and cannot be seen in FIG. 1. At a rear edge of the board 16 are formed plugs (not shown) to be engaged with corresponding sockets 18a and 18b which are provided at ends of respective cables 17a and 17b extending from a signal processing circuit (not shown) in the electronic information processing system. It should be noted that the recording/reproducing unit 13 is mounted on the frame 12 by known means such as screws in a detachable manner. At a front side of the body 11 of the information processing system is provided a front opening 19 adapted to allow insertion of the first disc. Further, a front panel 20 having an outer dimension adapted to the front opening 19 is detachably mounted to a front end of the frame 12 by using known means such as fitting or screws.

Figure 2:
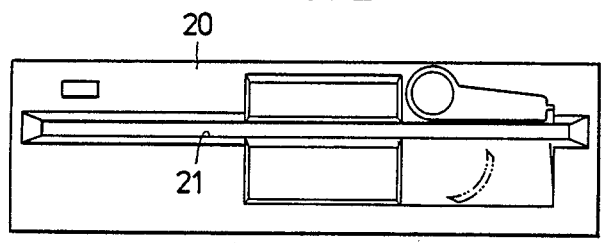
FIG. 2 is a front view of the magnetic disc recording and/or reproducing apparatus shown in FIG. 1.

FIG. 2 is a front view of the front panel 20 and shows a magnetic disc inserting opening 21 provided in the front panel 20. The opening 21 is adapted for accepting the first disc.

In an information processing system incorporating a magnetic disc recording and/or reproducing apparatus, there are instances that a user wishes to use information or software recorded on a second disc having a smaller diameter such as 3.5 inches. In the conventional magnetic disc recording and/or reproducing apparatus designed for the first disc, however, a recording/reproducing unit cannot be replaced with another recording/reproducing unit designed for the second disc. Thus, such a conventional magnetic disc recording and/or reproducing apparatus is not compatible with the second disc.

Figure 3:
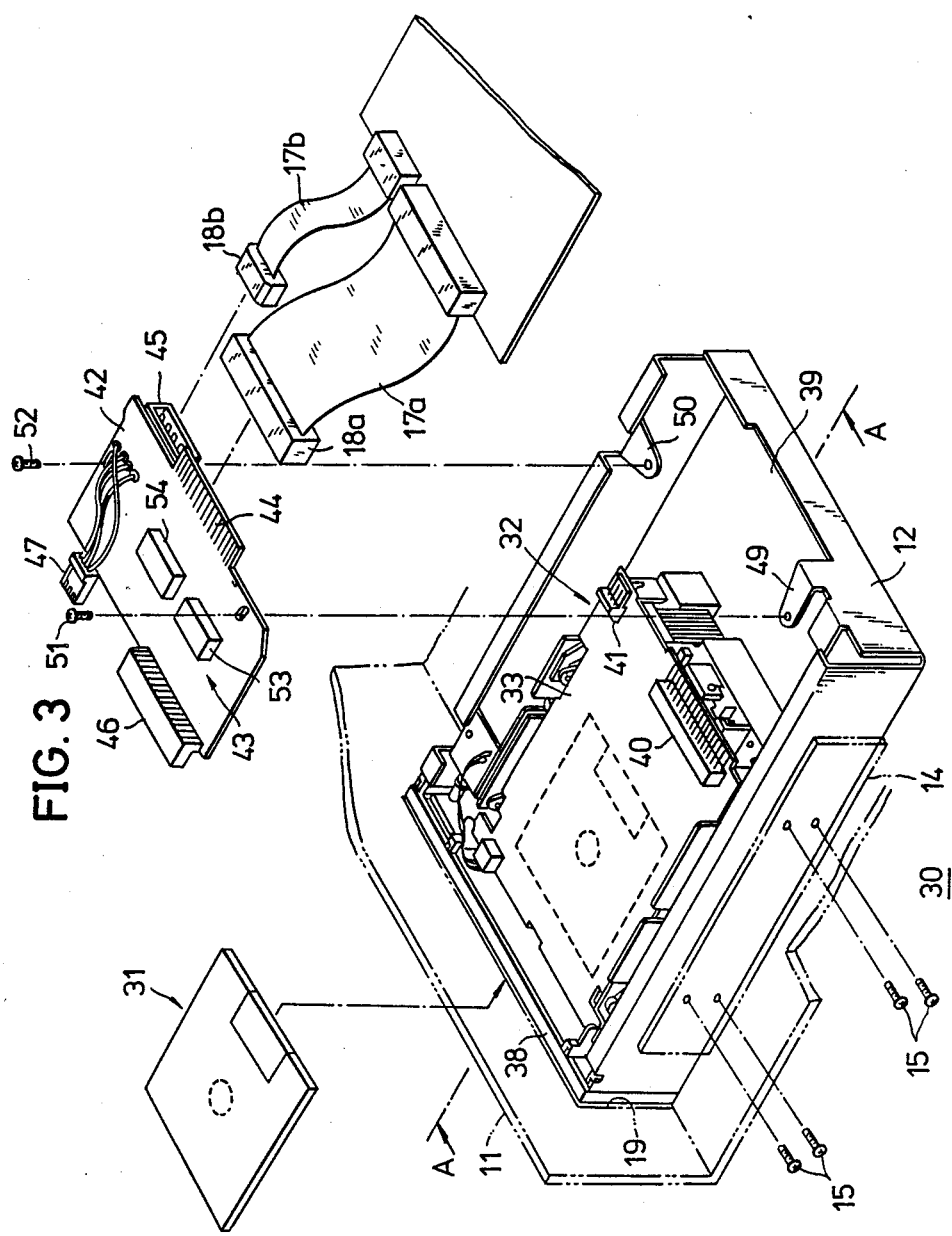
FIG. 3 is a perspective view showing another embodiment of the magnetic disc recording and/or reproducing apparatus in a state where a recording/reproducing unit adapted for a second magnetic disc having a diameter of 3.25 inches is mounted therein.

FIG. 3 shows another embodiment of the magnetic disc recording and/or reproducing apparatus according to the present invention. In the apparatus in FIG. 3, a recording/reproducing unit 32 designed to use a second disc is used in place of the recording/reproducing unit 13. In FIG. 3, those parts which are identical to those corresponding parts in FIG. 1 are designated by same reference numerals and the description thereof will be omitted.

Figure 4:
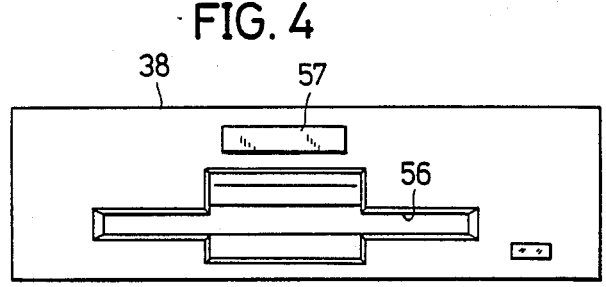
FIG. 4 is a front view of the magnetic disc recording and/or reproducing apparatus shown in FIG. 3.
Figure 5:
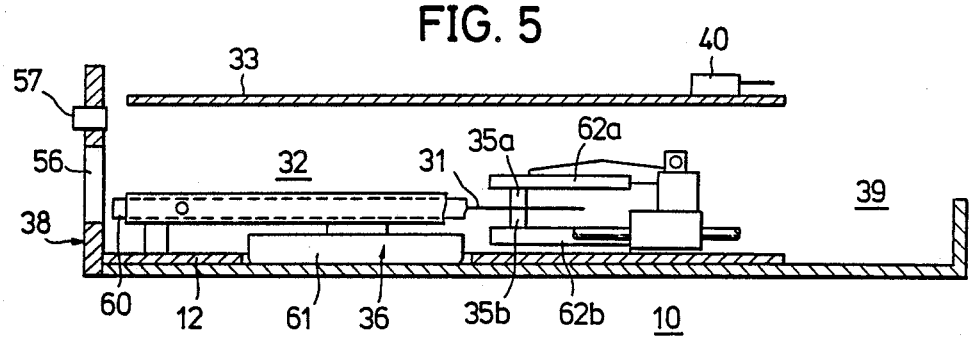
FIG. 5 is a cross sectional view of the recording/reproducing unit shown in FIG. 3 along a line A—A.

Referring to FIG. 3, a magnetic disc recording and/or reproducing apparatus 30 comprises a frame identical to the frame 12 used in the magnetic disc recording and/or reproducing apparatus 10 shown in FIG. 1. The frame 12 is mounted to the shelf portion 14 in the body 11 of the electronic information processing system by screws 15. The recording/reproducing unit 32 mounted in the frame 12 is designed to play a second disc 31 shown in FIG. 3 inserted thereto and records and/or reproduces an information signal to and from the magnetic disc. It should be noted that the recording/reproducing unit 32 is mounted on the frame in a detachable manner by known means such as screws (not shown). The recording/reproducing unit 32 for the second disc 31 is known and comprises a circuit board 33 which is mounted with magnetic disc holding mechanism, magnetic heads, driving mechanism, associated electronic circuits and the like (as shown in FIG. 5 which will be explained later). These parts are located underside of the board 33 and can be seen only partially in FIG. 3. At the front end of the frame 12 is fixed a front panel 38 in a detachable manner by known means such as fitting or screws (as shown in FIG. 4 which will be explained later). The recording/reproducing unit 32 is mounted on the frame 12 adjacent to the front panel 38 in a detachable manner by known means such as screws. The recording/reproducing unit 32 for the second disc generally has an outer dimension smaller than the outer dimension of the recording/reproducing unit 13 for the first disc. As a result, a space 39 is formed in the frame 12 adjacent to a rear end of the recording/reproducing unit 32. At a rear end of the board 33 are provided plugs 41 and 42 to which are engaged corresponding sockets 18a and 18b provided at the respective ends of the cables 17a and 17b extending from the information processing circuit of the electronic information processing system.

The cables 17a and 17b are usually adapted to the recording/reproducing unit 13 designed for the first disc, so there are instances where the length of the cable is insufficient when the recording/reproducing unit 32 for the second disc is to be used. There are also cases where rate of driving current and information signal formats are different between the recording/reproducing units 13 and 32. In order to overcome this problem, the present invention uses an intervening member 43 comprising a circuit board 42. At one end of the intervening member 43 are formed plugs 44 and 45 to be engaged with correspond sockets 18a and 18b, and at the other end of the intervening member 43 are provided sockets 46 and 47 which are engaged with corresponding plugs 40 and 41. The intervening member 43 is further adapted to have such a length that the member extends over the space 39. Thus, when the intervening member 43 is connected to the board 33 by engaging the sockets 46 and 47 to corresponding plugs 40 and 41, the member 43 closes the space 39. The intervening member 43, after being connected to the board 33, is fixed to the frame 12 in a detachable manner at supporting parts 49 and 50 formed in the frame 12 by screws 51 and 52. As the intervening member 43 connected to the board 33 extends over the space 39, the plugs 44 and 45 which are engaged by the sockets 18a and 18b are located at positions identical to those of the aforementioned plugs formed at the rear edge of the board 16. Thus, the same cables 17a and 17b can be used for both of the cases where the first disc is used and the 3.25 inch magnetic disc is used. Accordingly, an extension of the cables 17a and 17b is not required even when the second disc is used in combination with the recording/reproducing unit 32. Further, electronic devices such as integrated circuits (ICs) 53 and 54 for converting the driving current or information signal format may be mounted on the board 42 of the intervening member 43 according to the needs.

FIG. 4 is a front view of the front panel 38 and shows a magnetic disc inserting opening 56 adapted for insertion of the second disc 31 and a magnetic disc ejecting button 57 for taking out the magnetic disc from the apparatus 30. As described before, the front panel 38 is mounted to the front end of the frame 12 in a detachable manner by known means such as fitting or screws. The front panel 38 has an outer dimension which is identical to the outer dimension of the front panel 20. Thus, the front panel 38 fits in the opening 19 formed in the front side of the body 11.

FIG. 5 is a cross sectional view showing the recording/reproducing unit 32 along a line A—A in FIG. 3. FIG. 5 shows the magnetic disc 31 housed in a cartridge 60, driving mechanism 36 comprising a driving motor 61, magnetic heads 35a and 35b, and head arms 62a and 62b. The second disc is housed in the cartridge 60 and inserted into the apparatus 30 through the magnetic disc inserting opening 56. Thus, the magnetic disc 31 is held between a pair of magnetic heads 35a and 35b carried on the head arms 62a and 62b. The magnetic disc 31 is driven by the driving mechanism 36 comprising the motor 61. In the drawing, a known cartridge lowering mechanism used to lower the cartridge is not shown for simplifying the drawing. Further, the construction of the recording/reproducing unit 13 is generally identical to that of the recording/reproducing unit 33 except for the dimension, and the description thereof is therefore, omitted. It should be noted, however, that the space 39 does not exist in case the recording/reproducing unit 13 is used.

In case the user wishes to use the second disc in the electronic information processing system incorporating the magnetic disc recording and/or reproducing apparatus 10 adapted for the first disc, the sockets 18a and 18b at the end of the cables 17a and 17b are disconnected from the corresponding plugs on the board 16. Next, the screws 15 are removed and the apparatus 10 is removed from the body 11 of the electronic information processing system. Further, the front panel 20 of the apparatus 10 is removed from the frame 12 and the front panel 38 is mounted in place thereof on the frame 12 by screws or other means not shown. Then, the recording/reproducing unit 13 mounted on the frame is removed and the recording/reproducing unit 32 is mounted in place thereof in a detachable manner. Next, the intervening member 43 is connected to the board 33 of the recording/reproducing unit 32 by connecting the sockets 46 and 47 to corresponding plugs 40 and 41. The intervening member 43 is then fixed to the supporting part on the frame 12 by screws 51 and 52. Thus, the magnetic disc recording and/or reproducing apparatus 30 is assembled, and the assembled apparatus 30 is fixed to the shelf portion 14 in the body 11 of the electronic information processing system by the screws 15. Finally, the sockets 18a and 18b of the cables 17a and 17b are connected to the connectors 44 and 45.

In an opposite case in which the user wishes to use the first disc in the electronic information processing system incorporating the magnet disc recording and/or reproducing apparatus 30 adapted for the second disc, the recording/reproducing unit 32 is replaced by the recording/reproducing unit 13, and the front panel 38 is replaced by the front panel 20 according to an opposite procedure to that explained before. Thus, the sockets 18a and 18b at the end of the cables 17a and 17b are disconnected. Then, the screws 15 are removed and the apparatus 30 is removed from the body 11 of the electronic information processing system. Thereafter, the front panel 38 is removed from the frame 12 and the front panel 20 is mounted on the frame 12 in place thereof. In addition, the screws 51 and 52 are removed and the intervening member 43 is disconnected from the recording/reproducing unit 32 by disengaging the sockets 46 and 47 from the plugs 40 and 41. Further, the recording/reproducing unit 32 is removed from the frame 12 and the recording/reproducing unit 13 is mounted in place thereof in a detachable manner. Therefore, the magnetic disc recording and/or reproducing apparatus 10 is assembled and fixed to the shelf portion in the body 11 by screws 15. Finally, the cables 17a and 17b are connected by engaging the sockets 18a and 18b to the respective plugs on the board 16.

Heretofore, it is assumed that the first disc has a diameter of 5.25 inches and the second disc has a diameter of 3.5 inches. However, the present invention is applicable to any other discs having different diameters so long as the diameter of the first disc is larger than the diameter of the second disc. For example, the diameter of the first disc may be 8 inches and the diameter of the second disc may be 5.25 inches or 3.5 inches.

Further, the present invention is not limited to these embodiments, but various variations and modifications may be made without departing from the scope of the present invention.

What is claimed is:

1. A magnetic disc recording and/or reproducing apparatus for cooperation with an external information processing system for recording and/or reproduction of digital data on and from a flexible magnetic disc comprising:

a frame having a size substantially identical to a standardized frame used in a first standardized magnetic recording and/or reproducing apparatus for accommodating a first recording/reproducing unit for recording and/or reproducing a digital data on and from a first standardized flexible magnetic disc having a first standardized diameter, said frame being adapted to be mounted on a body of the external information processing system in a detachable manner;

a second recording/reproducing unit mounted on said frame for recording and/or reproducing a digital data on and from a second standardized flexible magnetic disc having a second standardized diameter smaller than the first standardized diameter, said second recording/reproducing unit having a second size substantially smaller than the size of the first recording/reproducing unit;

a front panel closing a front end of the frame and having an inserting opening with a size so as to allow insertion of said second standardized flexible magnetic disc therethrough; and a connector mounted on a rear end of the second recording/reproducing unit, said connector having a design identical to a standardized connector used in the first standardized apparatus; and an intervening member connected to said rear end of the second record/reproducing unit, said intervening member having a size measured perpendicularly to the front panel such that an overall size of the second recording/reproducing unit and the intervening member connected to the second recording/reproducing unit becomes substantially identical to that of the first recording/reproducing unit when measured perpendicularly to the front panel, said intervening member carrying a socket corresponding to said connector at a first side making contact with the rear end of the second recording/reproducing unit and a second connector on a second side opposite to said first side, and electrically connecting the second recording/reproducing unit to the external information processing system.

* * * * *